United States Patent

[11] 3,598,979

[72] Inventor Jean Pierre A. Moreau
Paris, France
[21] Appl. No. 792,103
[22] Filed Jan. 17, 1969
[45] Patented Aug. 10, 1971
[73] Assignee CSF-Compagnie Generale De Telegraphie Sans Fil
[32] Priority Jan. 26, 1968
[33] France
[31] 137 628

[54] DIGIT SEQUENCE CORRELATOR
5 Claims, 3 Drawing Figs.

[52] U.S. Cl. .......... 235/181, 235/177, 307/205, 307/221, 328/37, 340/146.2
[51] Int. Cl. .......... G06g 7/19, G06f 7/04
[50] Field of Search .......... 235/181, 177; 340/146.2, 146.3, 149; 307/215, 218, 221; 328/320, 121, 172, 151, 156, 157, 158

[56] References Cited
UNITED STATES PATENTS

| | | | |
|---|---|---|---|
| 2,615,127 | 10/1952 | Edwards | 340/149 |
| 2,641,696 | 6/1953 | Woolard | 340/146.2 |
| 2,831,987 | 4/1958 | Jones | 340/146.2 |
| 3,139,523 | 6/1964 | Luke | 340/146.2 |
| 3,376,411 | 4/1968 | Montani et al. | 235/181 X |
| 3,463,911 | 8/1969 | Dupraz et al. | 235/181 |
| 3,517,175 | 6/1970 | Williams | 235/177 |

OTHER REFERENCES

Princeton Applied Research Co. Model 100—Signal Correlator—Description November 1966

Bernard LuBow Correlation Entering New Fields Electronics Oct. 1966 p. 75— 81

*Primary Examiner*—Malcolm A. Morrison
*Assistant Examiner*—Felix D. Gruber
*Attorney*—Cushman, Darby & Cushman

ABSTRACT: A digital correlator able to recognize, within a digital message, a sequence of *n* predetermined digits, comprises a shift-register with at least *n*-stages in which there is stored the sequence to be recognized, a second register identical to the first, into which the incident sequence is fed, and an *n*-stage comparator which, stage by stage, compares the states of the two registers.

DIGIT SEQUENCE CORRELATOR

The present invention relates to digital correlators.

A digital correlator is a device able to recognize, within a digital message, a sequence of $n$ predetermined digits. To this end, the correlator comprises a shift-register comprising at least $n$-stages in which there is stored the sequence to be recognized, a second register identical to the first into which the incident sequence is fed, and an $n$-stage comparator which, stage by stage, compares the states of the two registers.

The incident sequence of digits is generally associated with noise. The consequence is that the comparison may never show perfect coincidence. This means that the N stages of the comparator will never be simultaneously excited, each stage being excited only if the comparison shows a coincidence. For a random incident sequence, the number of stages excited is on the average $n/2$, with a fluctuation in accordance with the Gaussian Law. The coincidence between the sequence stored in the register and the expected sequence, is evaluated on the basis that the number P of comparator stages excited is at least equal to $\alpha n$, $\alpha$ being in the order of 0.7 to 0.8.

Thus, the problem is to count the number of stages excited. Various techniques have been used, but the most straightforward is the analogue technique.

In an analogue device, measurement is generally carried out by means of impedance networks, in particular resistors and amplifiers. It is generally difficult to provide integrated circuits of this type for the following reasons:

a. It is not yet known how to produce high-precision integrated resistors;

b. The space occupied by high-precision resistors is far from negligible (0.5 cm.$^2$ generally speaking).

It is an object of this invention to provide a summing device for a digital correlator, which can be readily produced as an integrated circuit and incorporates only MOS circuits.

According to the invention there is provided a digital correlator comprising a first and a second register for storing digit sequences, having respective $n$ stages having respective outputs for storing respectively digits of the same order; $n$-comparators respectively coupled to the outputs of stages of said first and said second registers of the same order; said $n$-comparators having $n$ respective outputs; $n$-capacitors; $n$ first switches for connecting said $n$-capacitors respectively to said $n$-comparator outputs; voltage measuring means; and $n$-second switches for connecting in parallel said capacitors to said measuring means.

For a better understanding of the invention and to show how the same may be carried into effect, reference will be made to the drawing accompanying the ensuing description and in which:

FIG. 1 schematically illustrates the principle of the device according to the invention;

Figure 1:
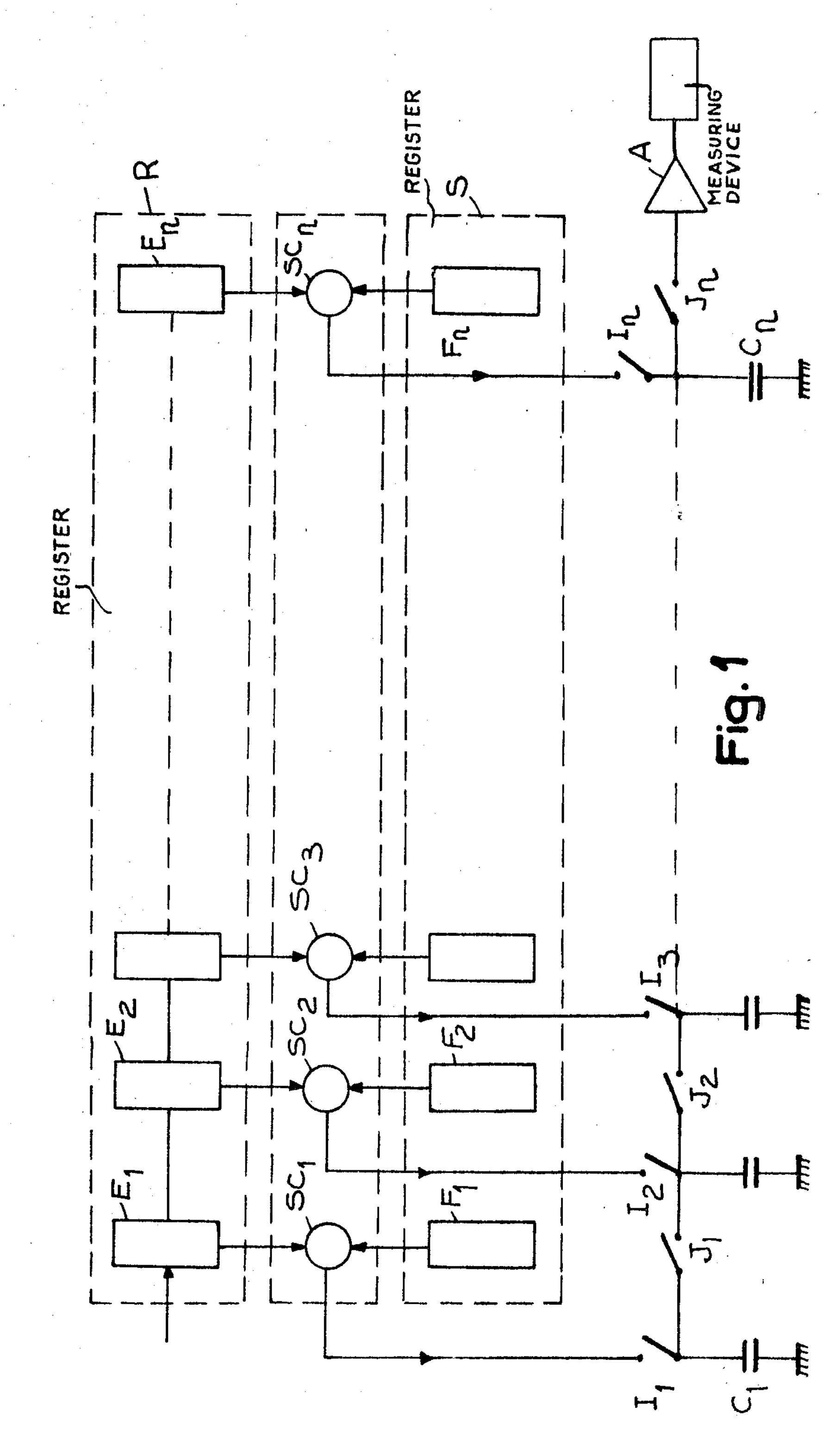

In FIG. 1, a shift-register R receives the sequences of incident binary digits 1 or 0.

The register has $n$ stages $E_1$, $E_2$—$E_n$, which are interconnected. A second register S has $n$-stages $F_1$—$F_n$. It is in this register that there is stored the sequence which is to be recognized in the train of incident digits. The similar order stages of the two registers R and S are respectively interconnected through comparators $SC_1$ to $SC_n$. The outputs of these comparators are respectively connected through switches $I_1$—$I_n$ to capacitors $C_1$—$C_n$, whose respective other electrodes are earthed. Switches $J_1$—$J_n$ place these capacitors in parallel and connect those armatures thereof which are not earthed, to the input of an amplifier A.

The operation of the system is sequential.

At the arrival of each digit (time $t_0$), the switches $I_1$—$I_n$ are closed, the switches $J_1$—$J_n$ open.

If the stages $E_j$ and $F_j$ are in the same state, a voltage is delivered by the comparator $SC_j$. This voltage charges up the capacitor $C_j$. At a time $t_1$, following $t_0$, the switches $I_j$ open and the switches $J_1$—$J_n$ close. The capacitors are placed in parallel and discharge across the amplifier A, which has a very high input impedance. This enables the final voltage $V_f$ of the capacitor armatures, connected to the switches, to be measured.

Designating by $V_1$ the output voltage of a comparator, and by P the number of capacitors charged, one has $$V_f = F/N\ V_1.$$

The measurement of the ratio $V_f/V_1$ enables to determine the ratio of the number of charged capacitors to the total number N thereof.

Figure 2:
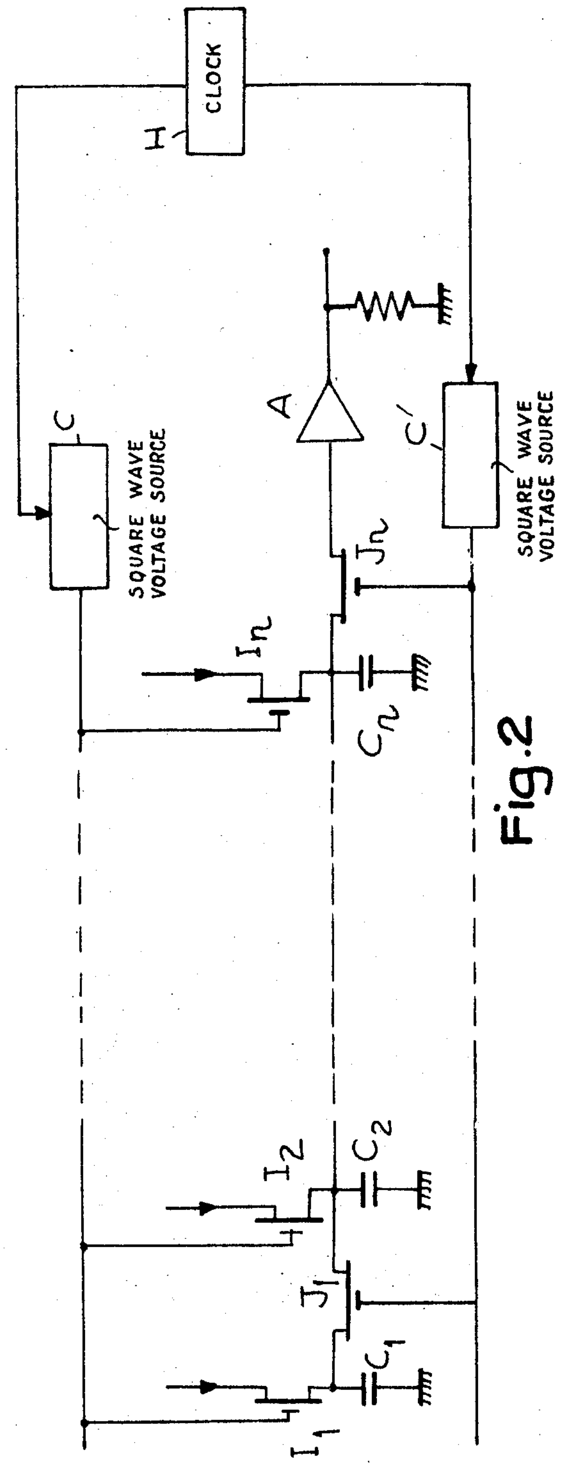
FIG. 2 illustrates an exemplary embodiment.

If this ratio is higher than a predetermined value $\alpha$, it is assumed that the expected sequence has arrived. FIG. 2 illustrates an embodiment of the system of capacitors and switches, in the form of integrated circuits. The switches $I_1$—$I_n$ and $J_1$—$J_n$ are conveniently field-effect MOS transistors, and the capacitors, MOS capacitors. As is well known, field effect structures are conveniently used as switches. On the other hand MOS structures are particularly suitable for manufacturing integrated circuits.

The switches $I_1$—$I_n$ are MOS field effect devices the source of which is connected in each case to the output of the corresponding comparator, the gates in parallel to a square wave voltage source C, and the drains to earth through the capacitors $C_1$—$C_n$.

The switches $J_1$—$J_n$ have their respective sources connected to the drains of the field-effect switches $I_1$—$I_n$, and to the drain of the field-effect switches J of immediately lower order. Their gates are connected in parallel to a square wave voltage source C′.

Figure 3:
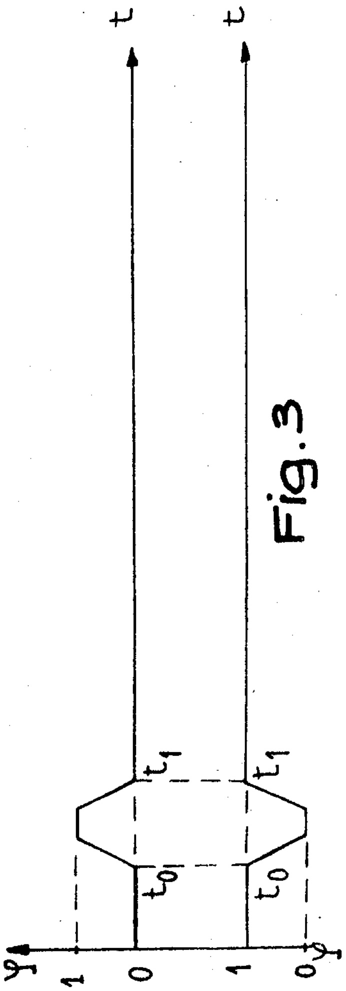
FIG. 3 illustrates a set of explanatory graphs.

The operation of the system is as follows:

The sources C and C′ are synchronized and supply complementary pulses Φ and Φ′ shown in FIG. 3. The pulses Φ unblock the transistors $I_1$—$I_n$, while the pulses Φ′ block the transistors $J_1$—$J_n$. The pulses have a duration of $t_0$—$t_1$.

The unblocking of the transistor $I_j$ enables the corresponding capacitor $c_i$ to charge up, if a voltage appears at the output terminal of the corresponding comparator. With the transistor $I_j$ blocked, the capacitor remains charged to the voltage $V_1$. At the end of the time $t_0$—$t_1$, the transistors $J_j$ are unblocked, the capacitors being then placed in parallel. The operation of the system then continues in the manner hereinbefore described.

The two sources C and C′ can be controlled by the same clock H.

In order that the summing may be carried out, within an approximation of one capacitor, the degree of precision of the capacitances should be better than $1/n$.

It is also possible to arrange for the weighting of the various digits of the sequence. All that is necessary then is to employ capacitors $C_i$ having different capacitances.

Of course the invention is not limited to the embodiments described and shown which were given solely by way of example.

What I claim is:

1. A digital correlator comprising a first and a second register for storing digit sequences, having respective $n$-stages having respective outputs for storing respectively digits of the same order, $n$ being an integer; $n$-comparators respectively coupled to the outputs of stages of said first and said second registers of the same order; said $n$-comparators having $n$ respective outputs; $n$-capacitors; $n$ first switches for connecting simultaneously said $n$-capacitors respectively to said $n$-comparator outputs; voltage measuring means; and $n$ second switches for connecting simultaneously in parallel said capacitors to said measuring means.

2. A correlator as claimed in claim 1 comprising means for simultaneously switching on said first switches, while switching out said second switches and vice versa.

3. A correlator as claimed in claim 2, wherein said first and second switches are respectively field-effect structures having control gates coupled to said switching means.

4. A correlator as claimed in claim 3, wherein the sources of said first field effect switches are coupled to the outputs of said comparator stages, their drains being coupled to said $n$-capacitors respectively; the sources of said second field effect switches being coupled to the drains of said first field effect switch of the same order, their drains being coupled to said capacitors corresponding to the following comparators respectively.

5. A correlator as claimed in claim 4, wherein said capacitor and switches are MOS structures.